(No Model.) 3 Sheets—Sheet 1.
A. CHABAUD, L. L. VAN HEERS & L. A. ALLARD.
COMBINED FURNACE FOR TREATING AND REDUCING ORES AND FOR REFINING THE RESULTING METALS.

No. 487,605. Patented Dec. 6, 1892.

(No Model.) 3 Sheets—Sheet 2.
A. CHABAUD, L. L. VAN HEERS & L. A. ALLARD.
COMBINED FURNACE FOR TREATING AND REDUCING ORES AND FOR REFINING THE RESULTING METALS.
No. 487,605. Patented Dec. 6, 1892.
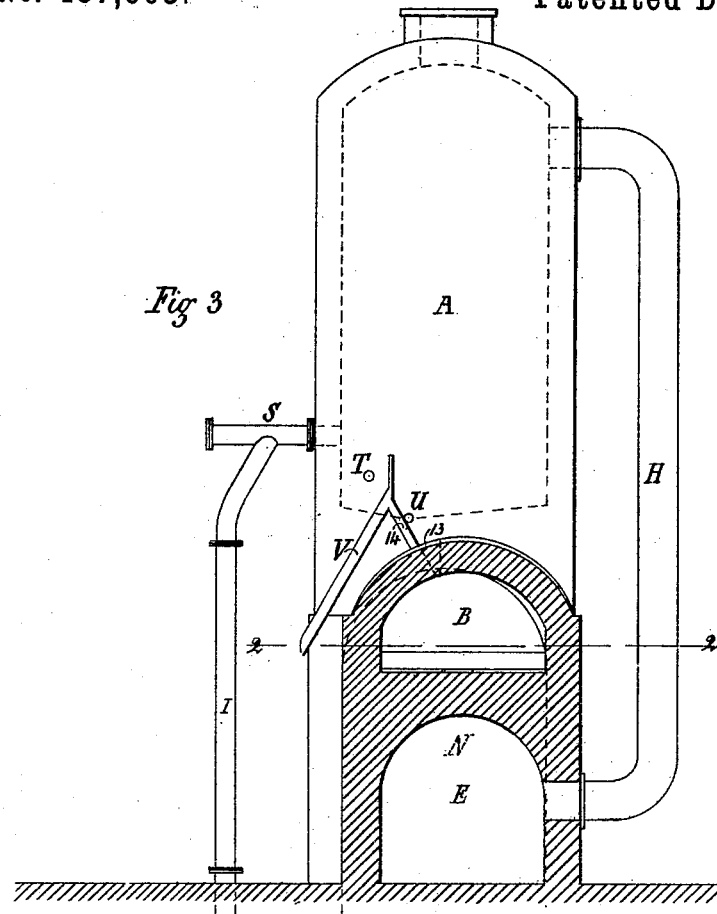
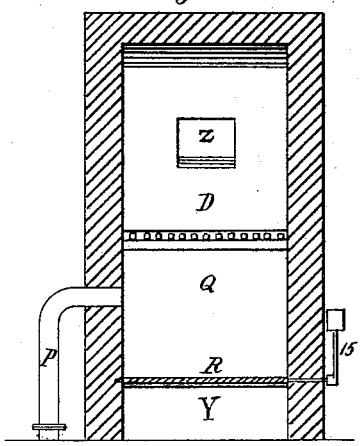
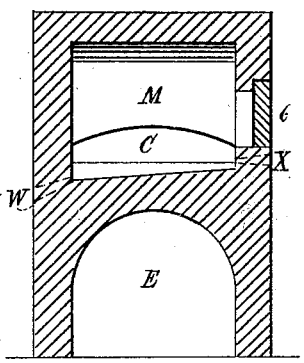
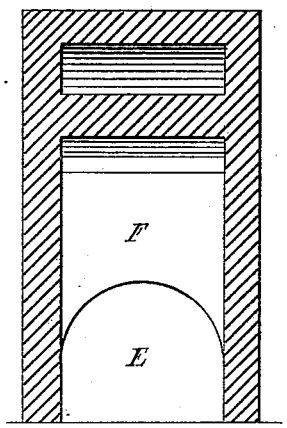
Witnesses
Inventors (No Model.) 3 Sheets—Sheet 3.
A. CHABAUD, L. L. VAN HEERS & L. A. ALLARD.
COMBINED FURNACE FOR TREATING AND REDUCING ORES AND FOR REFINING THE RESULTING METALS.

No. 487,605. Patented Dec. 6, 1892.

Witnesses
Julius H Smith
C. Goesel

Inventors
Antonin Chabaud
L. Leopold Van Heers
Louis A. Allard

UNITED STATES PATENT OFFICE.

ANTOINE CHABAUD, L. LÉOPOLD VAN HEERS, AND LOUIS A. ALLARD, OF ST. LOUIS, MISSOURI.

COMBINED FURNACE FOR TREATING AND REDUCING ORES AND FOR REFINING THE RESULTING METALS.

SPECIFICATION forming part of Letters Patent No. 487,605, dated December 6, 1892.

Application filed April 21, 1892. Serial No. 429,990. (No model.)

*To all whom it may concern:*

Be it known that we, ANTOINE CHABAUD and L. LÉOPOLD VAN HEERS, citizens of the United States, and LOUIS A. ALLARD, a citizen of the French Republic, all residing in the city of St. Louis, State of Missouri, have invented certain new and useful Improvements in Combined Furnaces for Treating and Reducing Ores and for Refining the Resulting Metals, of which the following is a specification.

Our invention relates to improvements in the construction of blast and refining furnaces combined for the treatment of ores subject to be reduced in a blast-furnace when the crude metals resulting from such reduction are of a nature requiring subsequent refining.

The object of our invention is to provide means and arrangements, first, to reclaim the very fine and dust-like particles of reduced metal which, as experience shows, are carried away with the waste gases of the blast-furnace, and in this manner to increase the yield of the ores treated; second, to keep the crude metal after having been tapped from the blast-furnace in a melted state until it has been subjected to the refining process and run out as refined merchantable metal, thereby making the operations of reducing the minerals and of refining the metals continuous and obtaining a considerable economy in time, in labor, and in expenses of every kind.

Figure 1:
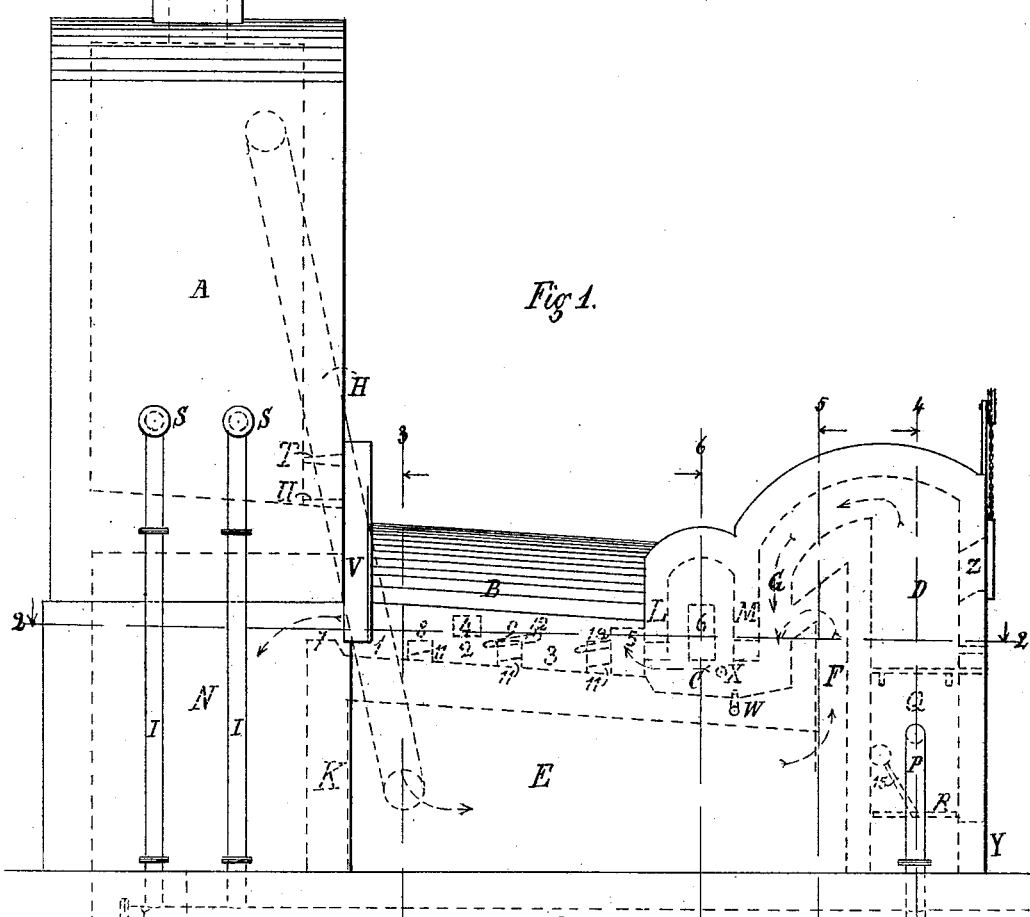
Figure 2:
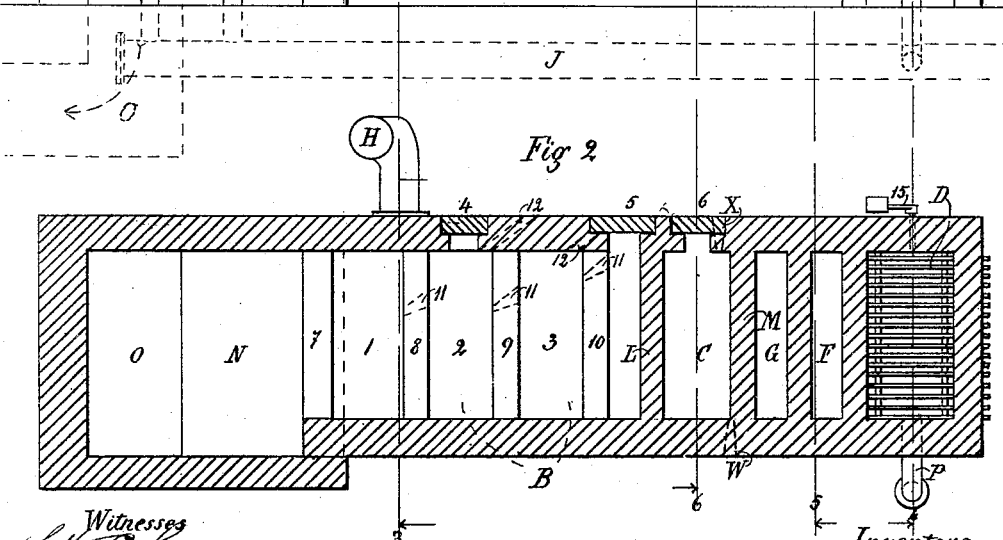
Figure 1A:
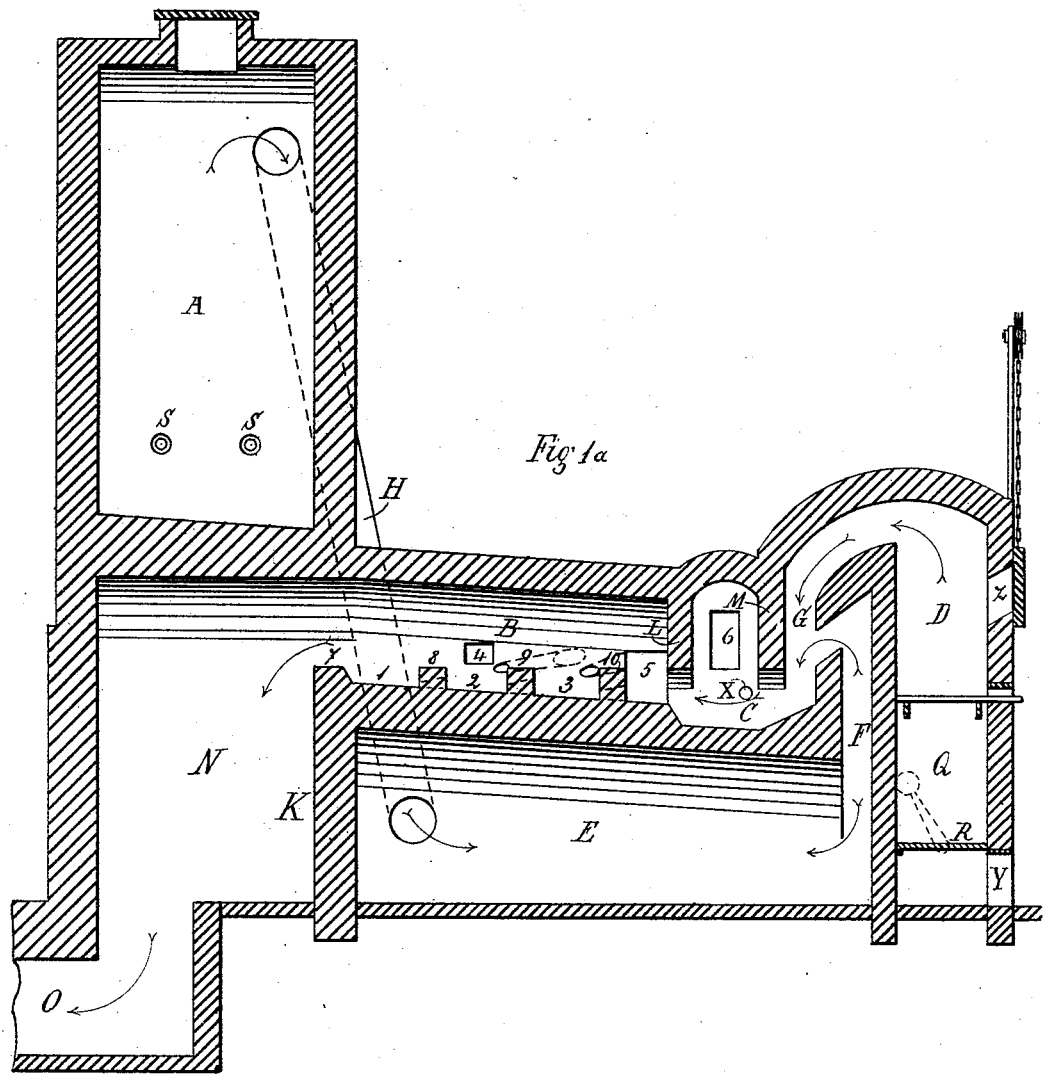

In the accompanying drawings, Figure 1 is a side elevation of a blast-furnace and a receiving, storing, and refining furnace combined. Fig. 1ª is a longitudinal vertical central section of the combined furnaces, showing the interior arrangements. Fig. 2 is a sectional plan on line 2, Figs. 1 and 3. Fig. 3 is a front elevation of the blast-furnace and a cross-section of receiving, storing, and refining furnace on line 3, Figs. 1 and 2. Fig. 4 is a cross-section on line 4, Fig. 5 a cross-section on line 5, and Fig. 6 a cross-section on line 6, of Figs. 1 and 2.

Similar parts are designated in all the figures by similar letters or numerals.

A is the blast-furnace, receiving its charges of ore, fuel, and flux through an opening on top, closed by a removable cover. The blast is supplied by a fan or blowing-machine through pipes J I and tuyeres S.

T is the cinder-tapping hole, discharging the cinders on cinder-run V. The metal is tapped out at U and runs over the metal-run 14 through a hole 13 in the arched roof of the receiving, storing, and refining furnace to the receiving-hearth 1.

The receiving, storing, and refining furnace consists in the receiving-hearth 1, the storing-hearths 2 and 3, the refining-hearth C, and the furnace D.

The low cross-walls 7, 8, 9, and 10 are provided for the purpose of confining the metal to its respective hearth. The cross-walls 8, 9, and 10 are supplied with tap-holes 11, which can be reached with tapping-bars through the oblique holes 12 in the side wall of the furnace. The opening 4 in the side wall is an inspection-hole, while the openings 5 and 6 are working doors for the manipulation of the metal contained in the refining-hearth C. The cinder-tap for the hearth C is at X and the metal-tap at W. The space Q under the grate of furnace D is supplied with air by the blast-pipe P, connected to pipe J, and is normally closed at the bottom by tilting plate R, which latter is covered by a layer of cinders and ashes dropped on it from the grate at each cleaning of the fire. Before each cleaning operation plate R can be tilted by means of the weighted lever 15, so as to drop its load through the opening Y at the bottom of the front wall of furnace D. Fuel is supplied to the furnace D through door Z, which is closed with a sliding tile or in any other convenient manner. The heated gases and flame developed in furnace D are conducted over the surface of the metal contained in the refining-hearth through flue G and through arched openings depressed by the cross-walls M and L. On leaving the hearth C they pass over the storing and the receiving hearth through arched passage B, of greatly-increased area, and are discharged into the space N under the blast-furnace bottom. From N they are conducted through underground flue O either directly or indirectly to a smoke-stack.

The connection between the blast-furnace

A and the receiving, storing, and refining furnace is made by means of flue H, connected to the top part of the blast-furnace and to the space E under the hearth 1, 2, 3, and C. This space E is separated from space N by partition-wall K, but is connected to flue G of furnace D by flue F, the whole connecting arrangement between the two furnaces being made so that the gases produced by the operation of the blast-furnace are discharged through flue H into space E and then conducted through flue F into the heated gases and flame passing through flue G from furnace D.

In operation the blast-furnace is supplied at regular intervals with proper charges of fuel, ore, and flux and with the required volume of air through the tuyeres and blast-pipes, so that the heat produced and maintained will be sufficient for the reduction of the ore and the melting of the metal. Whenever necessary, the liquid cinders are tapped out through cinder-tap T. Somewhat before a sufficient quantity of metal has accumulated at the bottom of the blast-furnace the refined metal on the refining-hearth C is tapped out into merchantable ingots. The charge in the storing-hearth 3 is tapped into C. Then the metal contained in 2 is tapped into 3 and the contents of the receiving-hearth 1 are tapped into 2. The receiving-hearth 1 being now empty, the metal in the blast-furnace is tapped into it through hole 13 in the roof of B. During the tapping operations the blast has been stopped, and only after every opening has been closed up and every compartment in the receiving, storing, and refining furnace has been filled with melted metal is the blast let on again, when it will drive the waste gases from the blast-furnace through flue H into space E and flue F, thence into flue G in the hot gases and flame sent out from the active fire in furnace D. Here the fine pulverulent and solidified particles of metal carried along in the current of waste gases from the blast-furnace, being subjected to an intense heat, are instantaneously melted, and the direction of the current determined by the flue G being downward they are hurled against the surface of the melted metal in the refining-hearth C in the form of a metal rain, and thereby become incorporated in this mass of metal. Whatever may remain suspended in the current of gases will gradually sink by its own weight in the metal contained in the storing and receiving hearth, the flow of gases being considerably reduced in speed by the increase of sectional area of the passage B.

What we claim as our invention, substantially as described, and for the purpose specified, is—

1. The combination of a blast-furnace and a refining-furnace containing a refining-hearth and a heating-furnace with means for conveying the waste gases of the blast-furnace into the flame of the heating-furnace and over the refining-hearth of the refining-furnace.

2. The combination of a blast-furnace and a receiving and refining furnace containing a receiving-hearth, a refining-hearth, and a heating-furnace with means for conveying the waste gases of the blast-furnace into the flame of the heating-furnace and over the refining and receiving hearth.

3. The blast-furnace and a receiving, storing, and refining furnace containing a receiving-hearth, a storing-hearth, a refining-hearth, and a heating-furnace, in combination with means for conveying the waste gases of the blast-furnace into the flame of the heating-furnace and over the refining, storing, and receiving hearth.

4. The blast-furnace and a receiving, storing, and refining furnace containing a receiving-hearth, a series of storing-hearths, a refining-hearth, and a heating-furnace, in combination with means for conveying the waste gases of the blast-furnace into the flame of the heating-furnace and over the refining, storing, and receiving hearth.

5. The blast-furnace and the receiving and refining hearth, the metal tap of the blast-furnace arranged to discharge onto the receiving-hearth, in combination with a heating-furnace and means for uniting the waste gases of the blast-furnace with the flame of the heating-furnace and for conveying the mixed gases and flame over the refining and receiving hearth.

6. The blast-furnace and the receiving, storing, and refining hearth, the arrangement of the metal tap of the blast-furnace discharging onto the receiving-hearth, in combination with a heating-furnace and means for conveying the waste gases of the blast-furnace into the flame of the heating-furnace and the mingled gases and flame over the refining, storing, and receiving hearth and under the bottom of the blast-furnace.

7. The blast-furnace and a refining-furnace containing a refining-hearth and a heating-furnace, in combination with means for conveying the waste gases of the blast-furnace under the refining-hearth, thence into the flame of the heating-furnace, and over the surface of the melted metal in the refining-hearth.

8. The blast-furnace and the refining-furnace containing a receiving-hearth, a refining-hearth, and a heating-furnace, in combination with means for conveying the waste gases of the blast-furnace under the refining and receiving hearth, thence into the flame of the heating-furnace, and the mingled gases and flame over the refining and receiving hearth.

9. The blast-furnace, a receiving, a storing, and a refining hearth, and a heating-furnace, in combination with means for conveying the waste gases of the blast-furnace under the receiving, storing, and refining hearth, thence into the flame of the heating-furnace, and the mingled gases and flame over the refining, the storing, and the receiving hearth.

10. The blast-furnace, a receiving-hearth, a series of storing-hearths, a refining-hearth, and a heating-furnace, in combination with means for conveying the waste gases of the blast-furnace under the receiving-hearth, under the series of storing-hearths and under the refining-hearth, and thence into the flame of the heating-furnace, and the mixed gases and flame over the refining, the series of storing, and the receiving hearth.

11. The blast-furnace, a receiving-hearth, a storing-hearth, a refining-hearth, and a heating-furnace with an air-blast pipe, in combination with means for conveying the waste gases of the blast-furnace into the flame of the heating-furnace and the mingled gases and flame over the refining, the storing, and the receiving hearth and under the bottom of the blast-furnace.

12. The blast-furnace, a receiving-hearth, a series of storing-hearths, a refining-hearth, and a heating-furnace with an air-blast pipe, in combination with means for conveying the waste gases of the blast-furnace into the flame of the heating-furnace and the mingled gases and flame over the refining, the series of storing, and the receiving hearth and under the bottom of the blast-furnace.

ANTOINE CHABAUD.
L. LÉOPOLD VAN HEERS.
LOUIS A. ALLARD.

Witnesses:
ALBERT G. BLANK,
L. H. LOHMEYER.